(12) United States Patent
Yebka et al.

(10) Patent No.: US 11,522,237 B2
(45) Date of Patent: Dec. 6, 2022

(54) HEAT CONTROL IN BATTERY PACK STACK

(71) Applicant: Lenovo (Singapore) Pte. Ltd., Singapore (SG)

(72) Inventors: Bouziane Yebka, Apex, NC (US); Philip John Jakes, Durham, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 373 days.

(21) Appl. No.: 16/783,747

(22) Filed: Feb. 6, 2020

(65) Prior Publication Data
US 2021/0249708 A1    Aug. 12, 2021

(51) Int. Cl.
| | | |
|---|---|---|
| *H01M 10/655* | (2014.01) | |
| *H01M 10/20* | (2006.01) | |
| *H02J 7/00* | (2006.01) | |
| *H01M 50/20* | (2021.01) | |

(52) U.S. Cl.
CPC ......... *H01M 10/655* (2015.04); *H01M 50/20* (2021.01); *H02J 7/00* (2013.01)

(58) Field of Classification Search
CPC ......... H01M 10/655; H01M 50/20; H02J 7/00
USPC .......................................... 320/112, 116, 126
See application file for complete search history.

(56) References Cited

U.S. PATENT DOCUMENTS

| | | | | |
|---|---|---|---|---|
| 9,257,729 B2* | 2/2016 | Hermann | ............... | B60L 58/14 |
| 10,971,780 B2* | 4/2021 | Yebka | ............... | H01M 50/136 |
| 11,127,995 B2* | 9/2021 | Juzkow | ............... | H01M 10/659 |
| 11,258,116 B2* | 2/2022 | Ahn | ............... | H01M 10/6561 |
| 2010/0209759 A1* | 8/2010 | Rejman | ............... | H01M 10/6557 429/156 |
| 2011/0129719 A1* | 6/2011 | Kwag | ............... | H01M 10/613 429/158 |
| 2014/0113184 A1* | 4/2014 | Hamel | ............... | H01M 50/178 429/163 |
| 2016/0020497 A1* | 1/2016 | Biskup | ............... | H01M 10/6556 429/120 |
| 2017/0018750 A1* | 1/2017 | Wintner | ............... | H01M 10/6556 |
| 2017/0047572 A1* | 2/2017 | Biskup | ............... | H01M 50/509 |
| 2020/0067155 A1* | 2/2020 | Hwang | ............... | H01M 10/6556 |
| 2020/0106143 A1* | 4/2020 | Juzkow | ............... | H01M 10/0525 |
| 2020/0153057 A1* | 5/2020 | Wynn | ............... | H01M 50/213 |
| 2021/0210825 A1* | 7/2021 | Lepiorz | ............... | H01M 50/566 |
| 2021/0249741 A1* | 8/2021 | Lepiorz | ............... | H01M 50/517 |
| 2022/0029220 A1* | 1/2022 | Hwang | ............... | H01M 10/613 |

FOREIGN PATENT DOCUMENTS

| | | | | | |
|---|---|---|---|---|---|
| CN | 113161646 A | * | 7/2021 | | |
| DE | 112019005686 A1 | * | 7/2021 | ............ | H01M 10/60 |
| WO | WO-2019074247 A1 | * | 4/2019 | ........ | H01M 10/0486 |
| WO | WO-2020009465 A1 | * | 1/2020 | .......... | H01M 10/613 |

* cited by examiner

*Primary Examiner* — Phallaka Kik
(74) *Attorney, Agent, or Firm* — Ference & Associates LLC

(57) ABSTRACT

One embodiment provides an electronic device, including: a battery pack stack comprising at least two battery packs; wherein the battery pack stack comprises at least one cumulative heat reducing component positioned between the at least two battery packs. Other aspects are described and claimed.

17 Claims, 6 Drawing Sheets

HEAT CONTROL IN BATTERY PACK STACK

BACKGROUND

Mobile electronic devices ("devices"), for examples smart phones, tablets, laptop computers, and the like, must be powered in some way. In situations where the device is not attached to a connected power source such as an AC line, a charger, a power bank, etc., the device must draw energy from one or more battery packs integrated into the device. Through battery discharge, the device may draw the energy needed to power the device and/or to operate one or more applications on the device.

BRIEF SUMMARY

In summary, one aspect provides an electronic device, comprising: a battery pack stack comprising at least two battery packs; wherein the battery pack stack comprises at least one cumulative heat reducing component positioned between the at least two battery packs.

Another aspect provides a battery pack stack, comprising: at least two battery packs; at least one cumulative heat reducing component positioned between the at least two battery packs.

A further aspect provides an electronic device, comprising: a battery pack stack comprising at least two battery packs; wherein one of the at least two battery packs proximate to another of the at least two battery packs is positioned in a flipped orientation with respect to the another of the at least two battery packs.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Heat is generated as device batteries are charged and correspondingly discharged during use. A number of factors may affect the rate at which heat is generated and/or how hot a battery pack cell ("cell") may become. For example, relevant factors may include cell number, thickness, capacity, charge/discharge rates, charge/discharge time interval, etc. If a cell is exposed to excessive heat over time, the lifespan of the cell may decrease and/or a number of other negative effects may occur. For example, the cell may stop working, bulge and/or bubble, damage the device, and, in extreme situations, explode.

Figure 1:
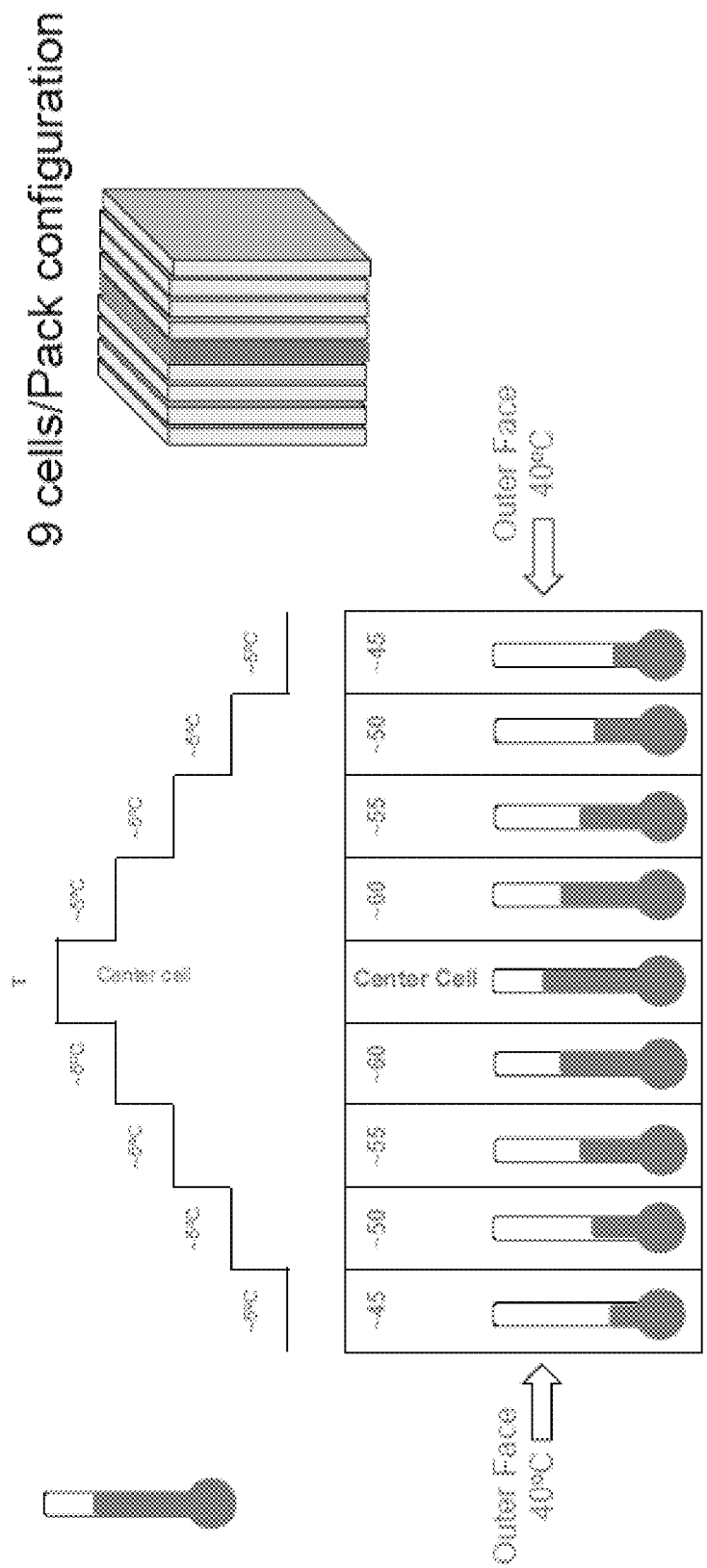
FIG. 1 illustrates a prior art configuration of battery cells in a stack.

Depending upon device/application requirements and/or hardware space limitations, cells may be stacked (e.g., on top of one another, next to each other, etc.). In these stacked configurations, heat may accumulate between the cells, which may correspondingly expedite the rate at which certain cells in the stack gain heat. As an example of the foregoing and with reference to FIG. 1, a conventional stacking configuration of nine cells is illustrated. As shown in FIG. 1, the cells located deeper within the stack (i.e., those located closer to the center cell) heat up quicker and operate at a higher temperature than those cells located closer to the outside of the stack. This is a result of the cumulative heat that develops between the cells.

Figure 2:
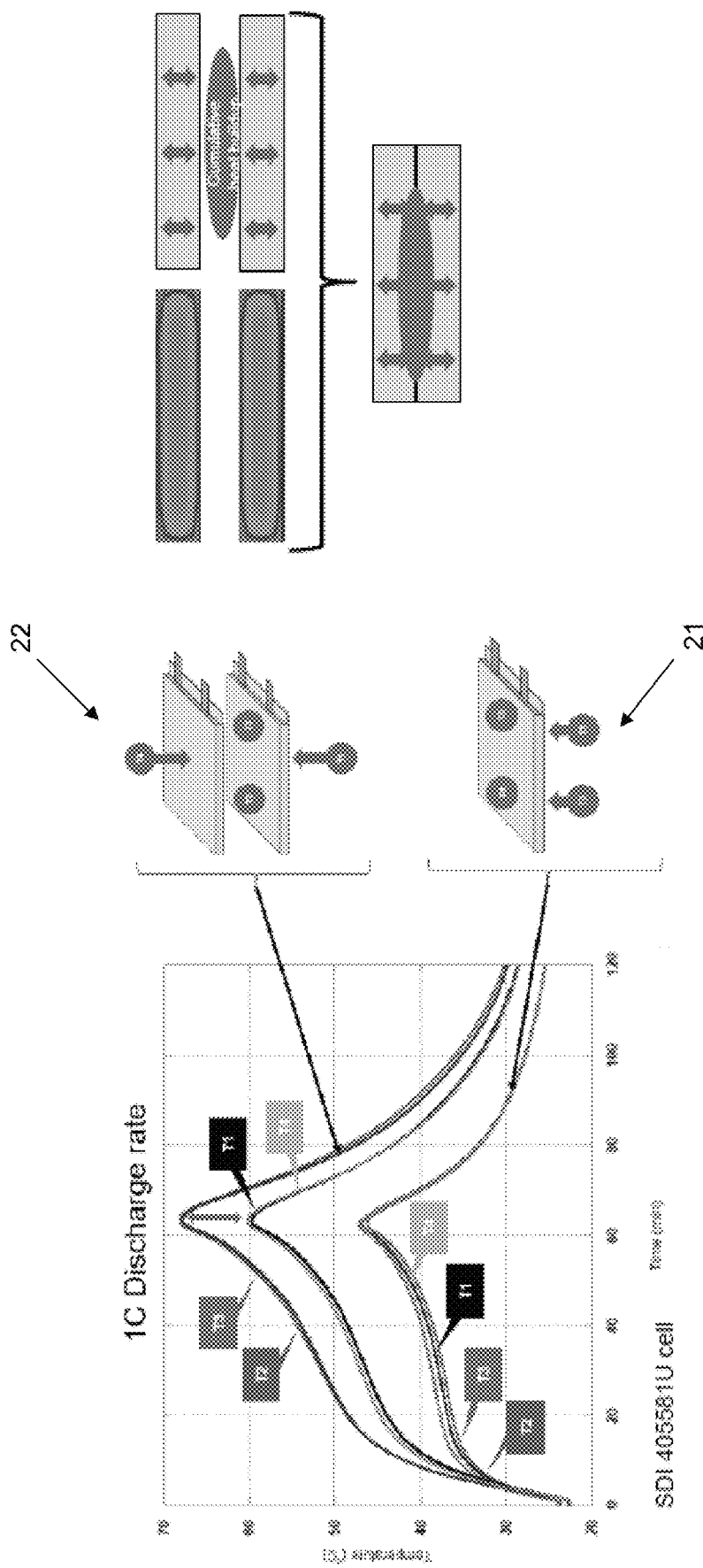
FIG. 2 provides a graph of temperature plots for a single cell and a conventional stack of cells during battery discharge.
Figure 3A:
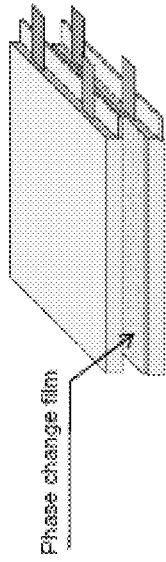
FIG. 3(A-C) illustrates a plurality of cumulative heat reducing components according to various embodiments.
Figure 3B:
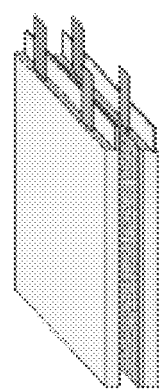
Figure 3C:
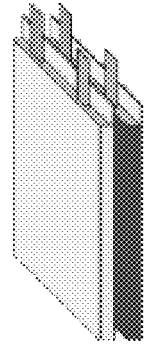
Figure 3C:
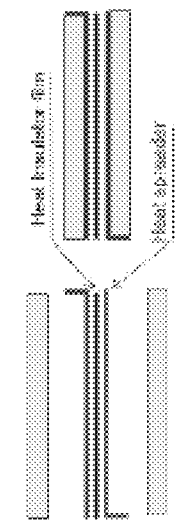

Referring now to FIG. 2, a graph is provided that further illustrates the challenges associated with heat management between cells in a stacked configuration. More particularly, a single cell configuration is pictured at 21 and a stacked cell configuration is pictured at 22. In each of these configurations, the temperatures at four different points (i.e., T1-T4 around the single cell in 21 or around the stack in 22) are tracked and recorded as the cell, or the stack, is discharged. In 21, the four points produce a substantially similar graph plot because there is no cumulative heat buildup in the single cell configuration. Conversely, an examination of the graph plots in 22 will reveal that T2 and T3 (i.e., the points located between the cells in the stack) plot out at a significantly higher temperature than T1 and T4 (i.e., the points located on the outer surfaces of the stack) due to the cumulative heat buildup between the cells.

Accordingly, an embodiment provides a method for minimizing the heat-amplifying affect that cumulative heat has on cells in a stack. In an embodiment, an electronic device may contain a battery pack stack that contains at least two cells. A heat reducing component (e.g., a heat conductive film, a heat insulating film bookended by two heat spreaders, a phase change film, etc.) may be positioned between each of the cells in the stack. In another embodiment, contacting cells in the stack may be positioned in an offset orientation from one another. The concepts described herein are intended to eliminate the peak temperature and reduce & homogenize the cumulative heat gradient in the battery pack in a multi cell stacking configuration.

The illustrated example embodiments will be best understood by reference to the figures. The following description is intended only by way of example, and simply illustrates certain example embodiments.

Figure 4:
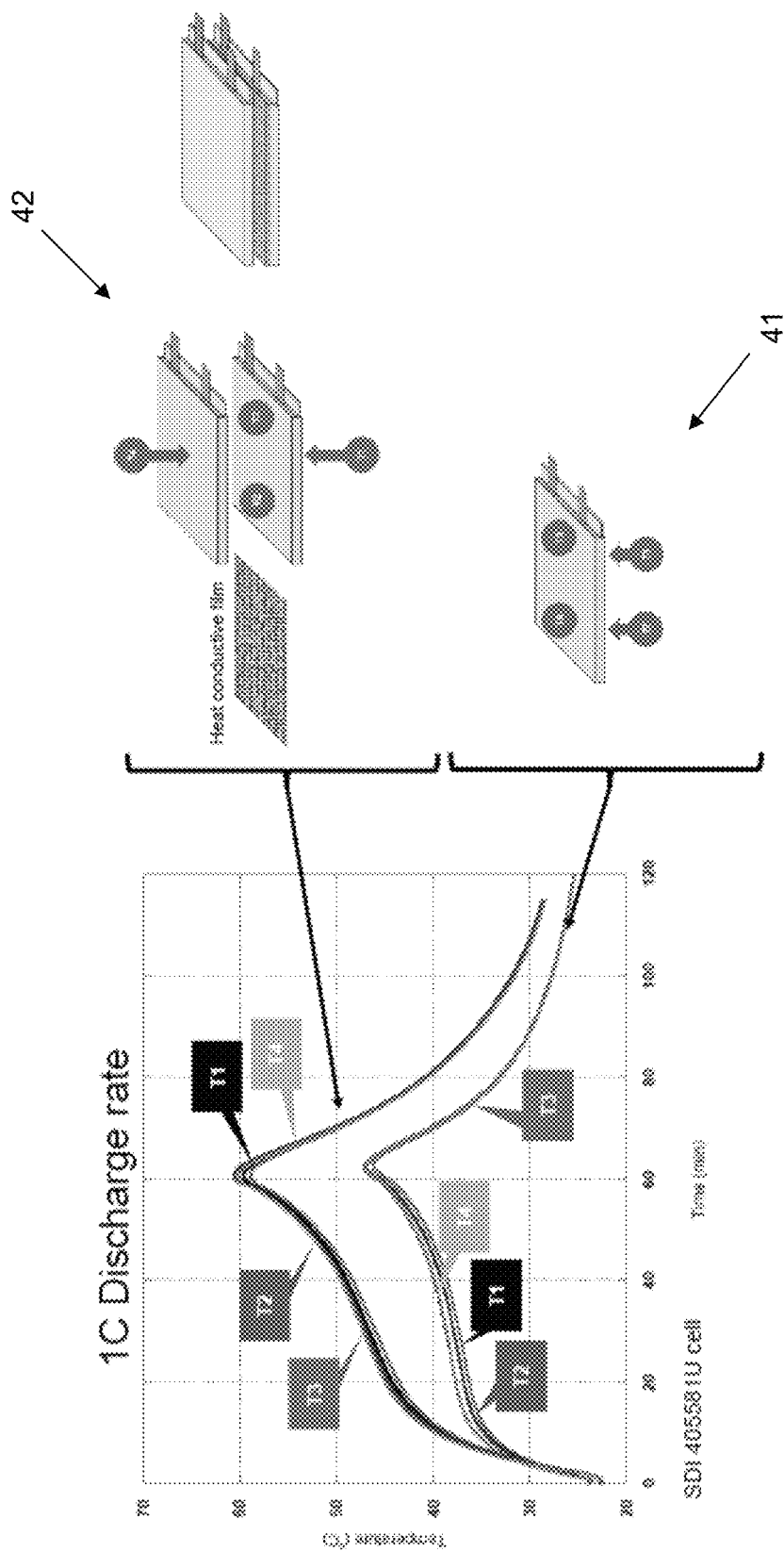
FIG. 4 provides a graph of temperature plots for a single cell and a stack of cells containing a cumulative heat reducing component during battery discharge.
Figure 5:
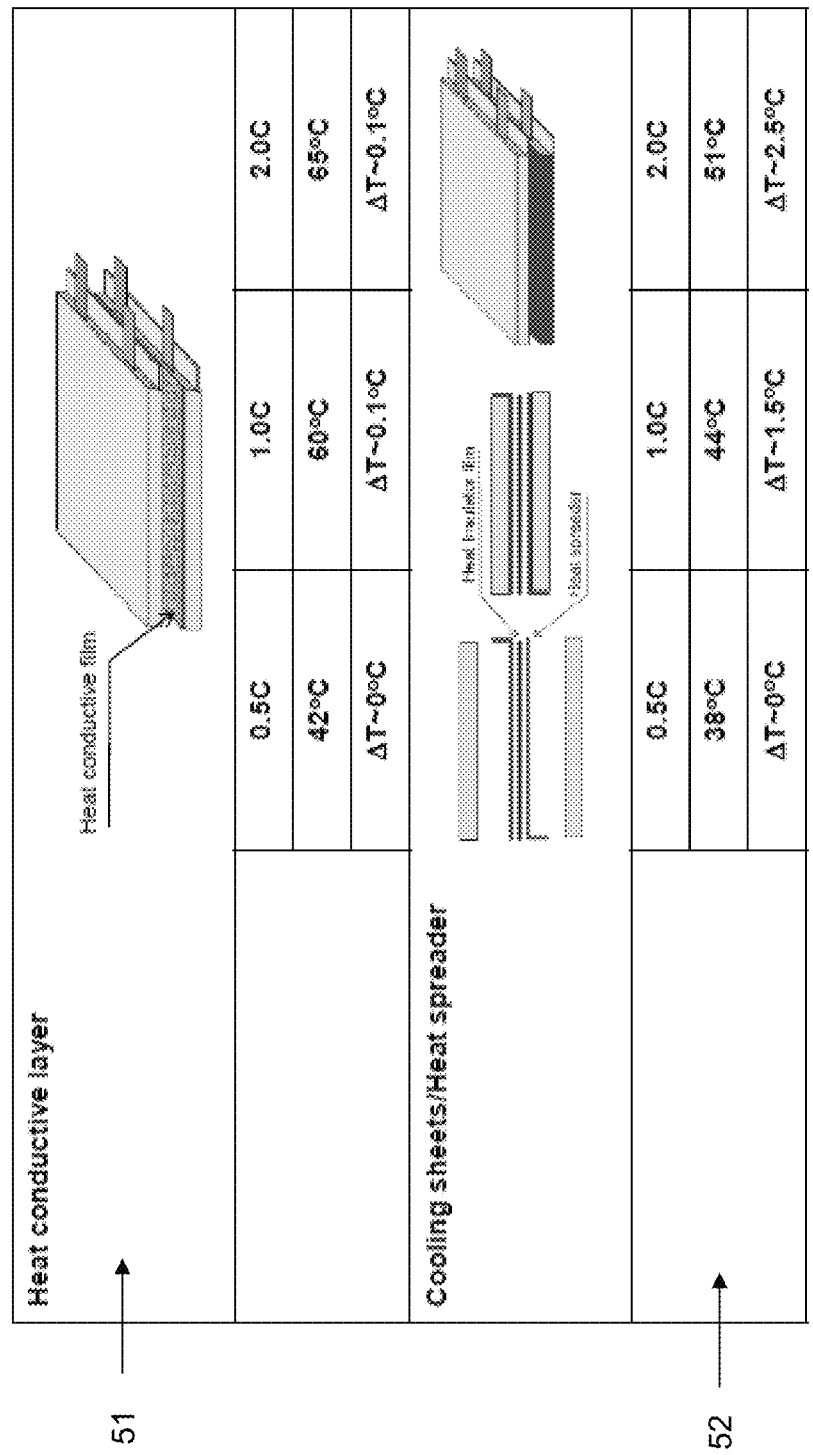
FIG. 5 provides a data table identifying resultant temperature effects on a cell stack caused by different cumulative heat reducing components.
Figure 6:
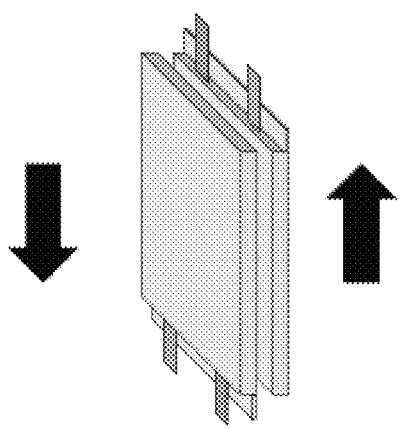
FIG. 6 illustrates a flipped orientation offset configuration of a stack of battery cells according to an embodiment.

The subsequent figures illustrate various methods for minimizing the negative impact of cumulative heat buildup between battery cells in a stack. More particularly, FIGS. 3-5 illustrate the utilization of a cumulative heat reducing component. FIG. 6 illustrates a flipped orientation stacking configuration of the stacked cells. It is important to note that the number and/or the orientation of the cells in the illustrated stacks is not limiting. More particularly, a single stack may contain as little as two cells or may contain many more. Additionally, the cells may be stacked in a vertical orientation or a horizontal orientation.

In an embodiment, a cumulative heat reducing component may be positioned between some or all of the cells in a stack. The heat reducing component may function to reduce the cumulative heat (i.e., the gradient temperature) that is produced between cells during battery discharge. In an embodiment, the heat reducing component may take a variety of different forms. For example, with reference to FIG. 3A, a cumulative heat reducing component is illustrated that is a heat conductive film. In an embodiment, the heat conductive film may be a heat conductive adhesive, as is commonly found in the art. As another example, with reference to FIG. 3B, a cumulative heat reducing component is illustrated that may be a phase change material, such as a wax film. During battery discharge, the generated cumulative heat may facilitate the phase change of the film (i.e., melt it), which may cause the wax material to absorb the heat. In yet another example, with reference to FIG. 3C, a cumulative heat reducing component is illustrated that may comprise a heat insulating film that is bookended on both surfaces by two conductive layers. These conductive layers may be composed of a heat conductive material (e.g., metallic sheet, ceramic, etc.) and may act as cooling sheets to help cool the cells that they contact.

Turning now to FIG. 4, a graph is provided that illustrates the cumulative heat reducing effects that may be achieved via utilization of the heat conductive film. Similar to FIG. 2, a single cell configuration is pictured at 41 and a stacked cell configuration is pictured at 42. In each of these configurations, the temperatures at four different points (i.e., T1-T4 around the single cell in 41 or around the stack in 42) are tracked and recorded as the cell, or the stack, is discharged. In 41, the four points produce a substantially similar graph plot because there is no cumulative heat buildup in the single cell configuration. Contrary to the graph plot produced by the stacked cells 22 in FIG. 2, the graph plots for 41 and 42 are substantially identical, albeit that 42 plots out at a higher temperature. Stated differently, the differences in the graph plots between 22 and 42 illustrate the cumulative heat minimizing effect that may be achieved by using a heat conductive film. A similar graph plot, although note explicitly illustrated here, may also be achieved via utilization of a phase change film or a heat-spreader unit.

Dependent upon which of the cumulative heat reducing components is used, different benefits in the cell stack may be achieved. More particularly, and with reference to FIG. 5, a data table that identifies the average operating temperature of cells in a stack, and the change in the cumulative temperature at different discharge rates, is provided. The cell stack 51 may employ a heat conductive film whereas the cell stack 52 may employ an insulator film/cooling sheet unit. At 51, the change in cumulative temperature remains substantially consistent at 0° C. across the presented discharge rates. Conversely, at 52, the change in cumulative temperature changes an appreciable amount (i.e., 2.5° C.) across the presented discharge rates. However, the average operating temperature of the cells for 52 is much lower than the same for 51. Dependent upon the needs of the user, the needs of the device, or the limitations of the cells in the stack, one of the foregoing cumulative heat reducing components may be favored over the other. For example, if a situation demands that the change in heat gradient between cells in a stack be virtually 0, then the cumulative heat reducing component illustrated at 51 may be favored. Alternatively, if a situation demands that the cell stack operate at a lower peak temperature, then the cumulative heat reducing component illustrated at 52 may be favored.

Turning now to FIG. 6, a flipped orientation stacking configuration of the stacked cells is illustrated. In this configuration, two cells may be stacked together such that their respective tabs are facing opposite each other. This offset, or flipped, configuration may promote homogenized heating of the cells instead of conventional, single-side heating. In an embodiment, in the situation where a stack may comprise three or more cells, each of the cells may be positioned at a flipped, or offset, orientation with respect to the other cells in the stack.

The various embodiments described herein thus represent a technical improvement to conventional techniques for managing the cumulative heat that develops between cells in a stack. More particularly, an embodiment provides a stack of cells that may be positioned within a device. The stack may contain a cumulative heat reducing component that may minimize and/or redirect the cumulative heat. In another embodiment, stacked cells may be offset from one another in order to spread out the heat more even across the contacting cells. Using the techniques described herein, the cumulative heat that conventionally builds up between cells in a stack during cell discharge may be reduced and minimized.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
a battery pack stack comprising at least two battery packs;
wherein the battery pack stack comprises at least one cumulative heat reducing component positioned between the at least two battery packs, wherein the at least one cumulative heat reducing component comprises a heat insulating film located between a first and second heat spreader, wherein the first heat spreader touches one of the at least two battery packs and wherein the second heat spreader touches an adjacent second of the at least two battery packs.

2. The electronic device of claim 1, wherein the at least one cumulative heat reducing component is positioned between each of the at least two battery packs.

3. The electronic device of claim 1, wherein the battery pack stack is one of: a horizontal stack or a vertical stack.

4. The electronic device of claim 1, wherein the at least one cumulative heat reducing component further comprises a heat conductive film.

5. The electronic device of claim 4, wherein the heat conductive film is an adhesive.

6. The electronic device of claim 4, wherein the heat conductive film substantially eliminates cumulative heat between the at least two battery packs.

7. The electronic device of claim 1, wherein each of the two heat spreaders wrap at least partially around a corresponding inner surface of one of the at least two battery packs.

8. The electronic device of claim 1, wherein the at least one cumulative heat reducing component further comprises a phase change film.

9. The electronic device of claim 8, wherein the phase change film is composed of a wax material.

10. A battery pack stack, comprising:
at least two battery packs;
at least one cumulative heat reducing component positioned between the at least two battery packs, wherein the at least one cumulative heat reducing component comprises a heat insulating film located between a first and second heat spreader, wherein the first heat spreader touches one of the at least two battery packs and wherein the second heat spreader touches an adjacent second of the at least two battery packs.

11. The battery pack stack of claim 10, wherein the at least one cumulative heat reducing component is positioned between each of the at least two battery packs.

12. The battery pack stack of claim 10, wherein the battery pack stack is one of: a horizontal stack or a vertical stack.

13. The battery pack stack of claim 10, wherein the at least one cumulative heat reducing component further comprises a heat conductive film.

14. The battery pack stack of claim 13, wherein the heat conductive film is an adhesive.

15. The battery pack stack of claim 10, wherein each of the two heat spreaders wrap at least partially around a corresponding inner surface of one of the at least two battery packs.

16. The battery pack stack of claim 10, wherein the at least one cumulative heat reducing component further comprises a phase change film.

17. The battery pack stack of claim 16, wherein the phase change film is composed of a wax material.

* * * * *